(12) United States Patent
Tian

(10) Patent No.: US 7,646,505 B2
(45) Date of Patent: Jan. 12, 2010

(54) OPTIMIZED PRINTING OF ELECTRONIC DOCUMENTS

(75) Inventor: Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 811 days.

(21) Appl. No.: 11/333,892

(22) Filed: Jan. 17, 2006

(65) Prior Publication Data

US 2007/0165266 A1   Jul. 19, 2007

(51) Int. Cl.
  *G06F 15/00* (2006.01)
  *G06F 15/16* (2006.01)
(52) U.S. Cl. .................................. 358/1.15; 709/201
(58) Field of Classification Search ............... 358/1.15, 358/1.16, 1.13, 1.14, 1.18, 1.8, 1.9, 1.1; 705/1, 705/7, 8, 11, 28; 707/1, 204, 205, 200; 709/201, 709/230; 382/101, 173, 176, 304; 270/58.06, 270/58.03, 52.15; 711/170, 113, E12.005
See application file for complete search history.

(56) References Cited

U.S. PATENT DOCUMENTS 5,867,636 A * 2/1999 Walker ...................... 358/1.15

* cited by examiner

*Primary Examiner*—Saeid Ebrahimi Dehkordy
(74) *Attorney, Agent, or Firm*—Hickman Palermo Truong & Becker LLP; Edward A. Becker

(57) ABSTRACT

Approaches for the optimized printing of electronic documents are provided. The approaches are applicable to a wide variety of contexts and implementations and include generating an estimated processing time for an electronic document and reporting the estimated processing time back to a client device. Generating an estimated time to process includes processing at least a portion of the print data. Further, the approaches include re-ordering a processing queue based on the estimated processing time for the electronic document, and additionally based on an in-queue time for each print data in the processing queue. Further, any user-designated priority may be factored into the re-ordering of print data in the processing queue, or in the alternative, bypass the optimization process entirely. These approaches may be implemented on a printing device, a print server, a client device or any other device capable of utilizing these approaches.

30 Claims, 8 Drawing Sheets

| Print Data # | Estimated Processing Time Pn | In-Queue Time Qn | Weight Wn | Weighted Time Tn |
|---|---|---|---|---|
| 1 | 5 | 0 | 1 | 5 |
| 2 | 4 | 0 | 1 | 4 |
| 3 | 3 | 0 | 1 | 3 |
| 4 | 2 | 0 | 1 | 4 |
| 5 | 1 | 0 | 1 | 1 |

HEAD → 5

↓ Print Data 5 Printed

New Print Data 6 Received

504 —

| Print Data # | Estimated Processing Time Pn | In-Queue Time Qn | Weight Wn | Weighted Time Tn |
|---|---|---|---|---|
| 1 | 5 | 1 | .9 | 4.5 |
| 2 | 4 | 1 | .9 | 3.6 |
| 3 | 3 | 1 | .9 | 2.7 |
| 6 | 3 | 0 | 1 | 1.8 |
| 4 | 2 | 1 | .9 | 2 |

HEAD → 4

↓ Print Data 4 Printed

506 —

| Print Data # | Estimated Processing Time Pn | In-Queue Time Qn | Weight Wn | Weighted Time Tn |
|---|---|---|---|---|
| 1 | 5 | 3 | .7 | 3.5 |
| 2 | 4 | 3 | .7 | 2.8 |
| 3 | 3 | 3 | .7 | 2.1 |
| 6 | 2 | 2 | .8 | 1.6 |

HEAD → 6

↓ Print Data 6 Printed

OPTIMIZED PRINTING OF ELECTRONIC DOCUMENTS

FIELD OF THE INVENTION

The present invention relates to printing devices, and more specifically, to an approach for optimized printing of electronic documents.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Users who submit electronic documents for printing desire the ability to confirm the status of the printing process. With the proliferation of printing technologies, users are currently able to confirm that an electronic document has been received at a printer. For instance, some operating system (OS) printing systems currently have the ability to detect the page count and file size when processing a print job and can then report this information back to the user. However, the size of an electronic document, as well as the number of pages to be printed, are not accurate indicators of how long it will take to print the document. For instance, in the case of a text document, a relatively large size document comprising many pages may process very quickly. On the other hand, in the case of images or multi-colored documents, a relatively smaller sized document with few pages may take much longer to print. Unfortunately, printing devices currently do not have the ability to report an accurate time representing how long the electronic document will take to print.

Further, in many situations, multiple users send multiple documents, ranging from pure text to large images to the same printing device. In order to organize incoming documents, printing devices usually include printing queues that are ordered first-in-first-out (FIFO), which means that electronic documents are printed or processed in the order they are received. In this scenario, a user who is submitting a text document of one page must wait until every document that was submitted beforehand to be printed. In some cases, it may be that the user must wait for an unreasonably long time for one page to print because the other documents in the queue all have long processing times.

One approach for solving this issue is allowing a user to manage the priority of the printing queue. Thus a user can change the job priority for a particular document or all documents in the queue. However, one setback of this approach is the requirement that each user must manually configure the priority of each job. Further, if each user decides to set a priority for a particular document, the problem remains unsolved.

Based on the foregoing, there is a need for optimizing the printing of electronic documents.

SUMMARY

Techniques are provided for the optimized printing of electronic documents. The approaches are applicable to a wide variety of contexts and implementations and include generating an estimated processing time for an electronic document and reporting the estimated processing time back to a client device. Generating an estimated time to process print data may include processing at least a portion of the print data. Further, the approaches include re-ordering a processing queue based on the estimated processing time for the print data in the processing queue, and additionally based on an in-queue time for each print data in the processing queue. Further, any user-designated priority may be factored into the re-ordering of print data in the processing queue, or in the alternative, bypass the optimization process entirely. The approaches described herein may be implemented on a printing device, a print server, a client device or any other device capable of utilizing these approaches.

According to one aspect of the invention, a printing device includes a print process configured to process print data and cause a printed version of an electronic document to be generated. The printing device is also configured to receive, over a communications network, first print data representing at least a portion of a first electronic document for processing. The printing device is further configured to generate an estimated time to process the first electronic document and place the first print data in a processing queue comprising one or more additional print data representing one or more additional electronic documents for processing. The printing device is further configured to re-order the first print data and the one or more additional print data in the processing queue based on the estimated time to process the first electronic document and one or more estimated times to process the one or more additional electronic documents.

According to another aspect of the invention, a printing device includes a print process configured to process print data and cause a printed version of an electronic document to be generated. The printing device is also configured to receive over a communications network first print data representing at least a portion of a first electronic document for processing. The printing device is further configured to determine a time for processing one or more portions of the first print data by rasterizing the one or more portions of the first print data, and based on the time to process one or more portions of the first print data, generate an estimated time to process the first electronic document. The printing device is further configured to place the first print data in a processing queue comprising one or more additional print data representing one or more additional electronic documents for processing and re-order the first print data and the one or more additional print data in the processing queue based on the estimated time to process the first electronic document and one or more estimated times to process the one or more additional electronic documents.

According to another aspect of the invention, a printing device includes a print process configured to process print data and cause a printed version of an electronic document to be generated. The printing device is also configured to receive print data representing a first electronic document for processing from a client device over a communications network, generate an estimated time to process the first electronic document and provide data back to the client device indicating the estimated time to process the first electronic document.

In other aspects, the invention encompasses a computer-implemented method and a computer-readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a block diagram that depicts a processing queue at different stages of the re-ordering process according to one embodiment of the invention.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. STRUCTURAL OVERVIEW
III. GENERATING AN ESTIMATED PROCESSING TIME FOR AN ELECTRONIC DOCUMENT
IV. RE-ORDERING PRINT DATA IN THE PROCESSING QUEUE
   A. Re-Ordering Based on Estimated Processing Time.
   B. Re-Ordering Based on In-Queue Time and Estimated Processing Time.
   C. Re-Ordering Based on the on In-Queue Time, Estimated Processing Time and Designated Priority of Print Data.
V IMPLEMENTATION MECHANISMS I. Overview Techniques are provided for the optimized printing of electronic documents. The approaches are applicable to a wide variety of contexts and implementations and include generating an estimated processing time for an electronic document and reporting the estimated processing time back to a client device. Generating an estimated time to process the electronic document may include processing at least a portion of the print data representing the electronic document. Further, the approaches include re-ordering print data in a processing queue based on estimated processing times for electronic documents represented by print data in the processing queue, and additionally based on an in-queue time for each print data in the processing queue. Further, any user-designated priority may be factored into the re-ordering of print data in the processing queue, or in the alternative, bypass the optimization process entirely. The approaches described herein may be implemented on a printing device, a print server, a client device or any other device capable of utilizing these approaches.

II. Structural Overview

Figure 1:
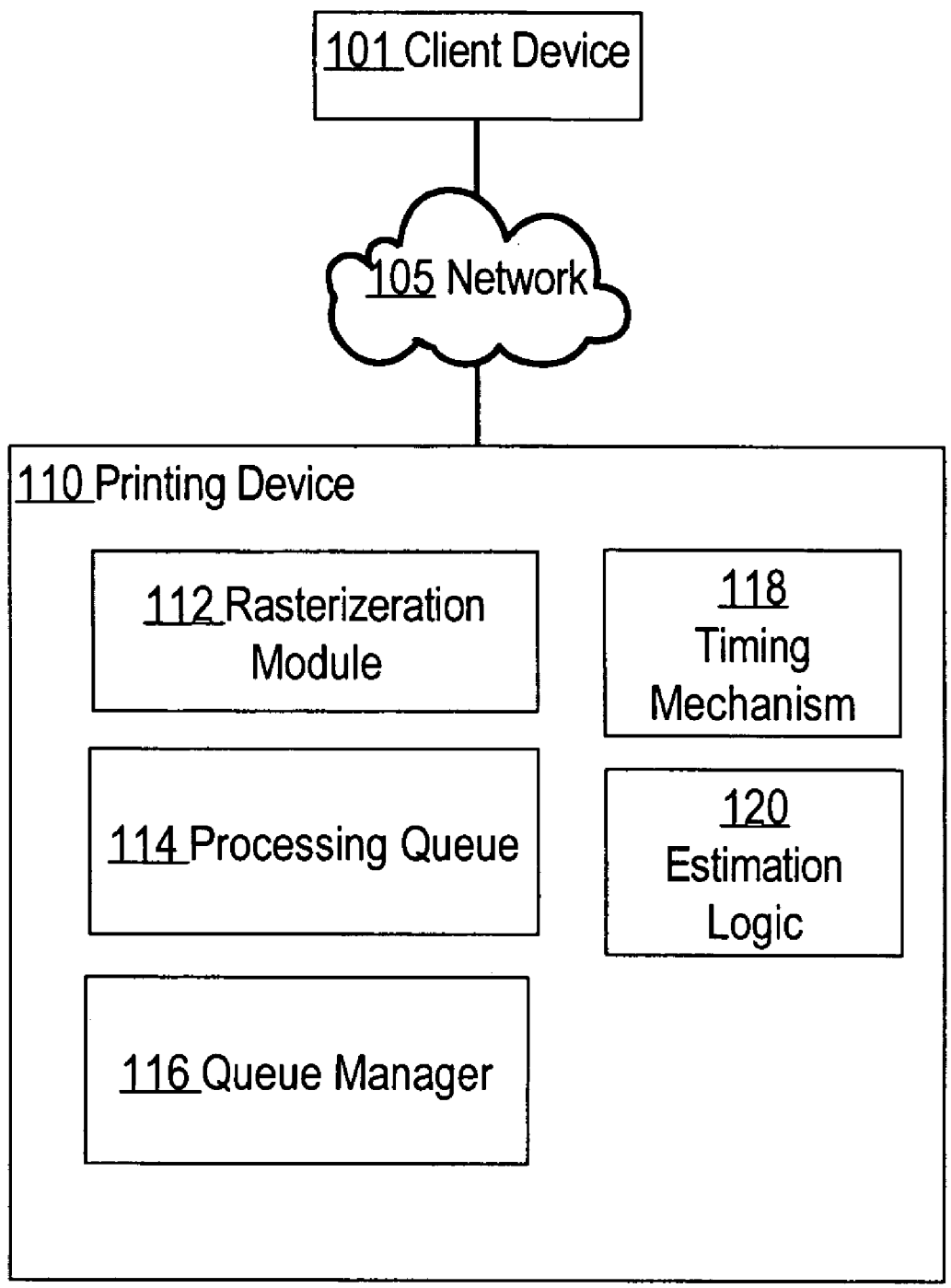
FIG. 1 is a block diagram representing an overview of an optimized printing system including an optimized printing device according to one embodiment of the invention.

Referring to FIG. 1, according to one embodiment, a system for providing optimized printing of electronic documents is shown. The system includes Client Device 101 and Printing Device 110, which are communicatively coupled to Network 105. Network 105 may be implemented by any medium or mechanism that provides for the exchange of data between Client Device 101 and Printing Device 110. Examples of Network 105 include, without limitation, a network such as a Local Area Network (LAN), Wide Area Network (WAN), Ethernet or the Internet, or one or more terrestrial, satellite or wireless links. Alternatively or in addition, Client Device 101 and Printing Device 110 may be directly connected through a communications link. According to one embodiment, Client Device 101 may be any device that requests an electronic document to be processed, such a personal computer (PC) or handheld device. Printing Device 110 may generally comprise a plurality of components, such as Rasterization Module 112, to receive and process at least a portion of print data and to determine a time to process one or portions of an electronic document. Further, Printing Device 110 may comprise a Processing Queue 114 to manage the processing of any print data received from Client Device 101. A Queue Manager 116 is configured to monitor and re-order data in the Processing Queue 114. Thus, Queue Manager 116 may change the order in which print data is processed to enable the optimized printing of electronic documents. Also, Printing Device 110 may comprise a Timing Mechanism 118 to keep track of time or act as a counter during the processing of an electronic document. Printing Device 110 may also comprise Estimation Logic 120, which is functional for estimating the amount of time it will take to process all of the print data representing an electronic document.

In another embodiment, any of the Rasterization Module 112, Processing Queue 114, Queue Manager 116, Timing Mechanism 118 and Estimation Logic 120 may be located in one or more different locations and on one or more devices. Thus, Printing Device 110 may receive print data from Client Device 101, but then instruct a separate Rasterization Module located over Network 105 to determine a time to process one or more portions of the print data. The Rasterization Module may, for instance, be part of a Web service accessed via Network 105. A Web service is not constrained by any memory limitation that may be imposed upon Printing Device 110. Instead, Printing Device 110 may borrow external resources to process print data. In this manner, resources need not be provisioned at Printing Device 110, and the described optimization procedure may be performed by any number of elements across a network or communications link.

In one embodiment, Client Device 101 sends print data to Printing Device 110 to have an electronic document represented by the print data printed. In one embodiment, Printing Device 110 receives the print data and causes the electronic document to be printed at an output tray of the Printing Device 110. Alternatively, the Printing Device 110 can cause the electronic document to be printed in any other manner, including but not limited to, sending the print data to another Printing Device for printing or sending the print data over a telephone line to a facsimile device for printing at the facsimile device.

Figure 2:
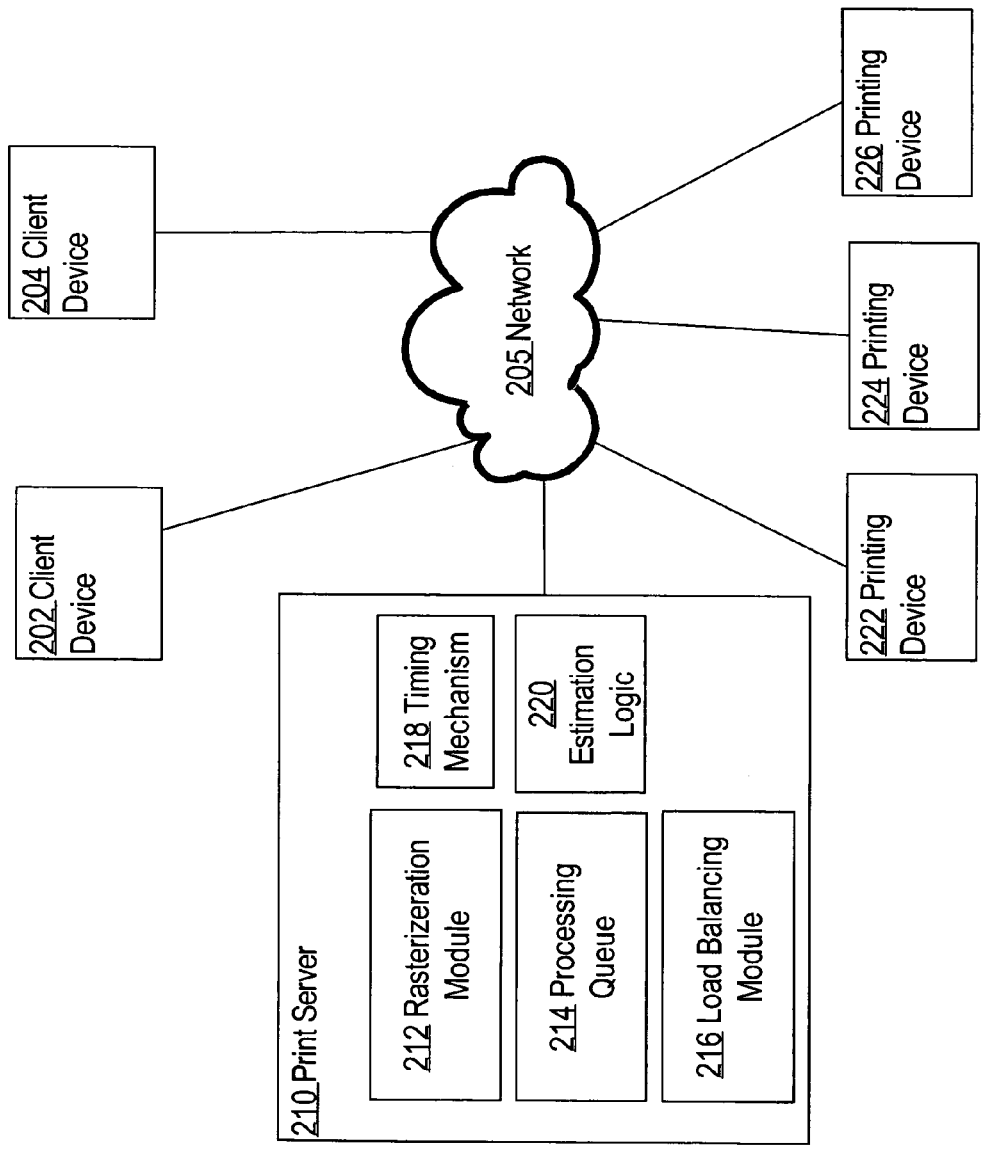
FIG. 2 is a block diagram of an example implementation of an optimized printing system including an optimized print server according to one embodiment of the invention.

Referring to FIG. 2, according to another embodiment, a second system for providing optimized printing of electronic documents is shown. The system includes Client Devices 202 and 204, Printing Devices 222, 224 and 226, as well as Print Server 210, which are each communicatively coupled to Network 205. Network 205 may be implemented by any medium or mechanism that provides for the exchange of data between Client Devices 202-204, Print Server 210 and Printing Devices 222-226. Examples of Network 205 include, without limitation, a network such as a Local Area Network (LAN), Wide Area Network (WAN), Ethernet or the Internet, or one or more terrestrial, satellite or wireless links. In other embodiments, Client Devices 202 and 204 may be directly connected via a communications link to Print Server 210, and Print Server 210 may further be directly connected to Printing Devices 222 and 224 using an appropriate communications channel.

In one embodiment, Print Server 210, much like Printing Device 110, comprises a Rasterization Module 212, a Processing Queue 214, a Load Balancing Module 216, a Timing Mechanism 218 and Estimation Logic 220. The Rasterization Module 212 may be identical to the Rasterization module as described in relation to Printing Device 110. Also, in one embodiment, the Processing Queue 214 may be identical to the Processing Queue of Printing Device 110. However, in another embodiment, the Print Server 210 may be configured to handle multiple Processing Queues dedicated to any number of Printing Devices. Further, in one embodiment, Timing Mechanism 218 and Estimation Logic 220 may be identical to Timing Mechanism 118 and Estimation Logic 220. Additionally, according to another embodiment, Timing Mechanism 218 and Estimation Logic 220 may be configured to handle the timing and estimation for processing multiple electronic documents at the same time from multiple Client Devices 202-204 over Network 205.

Further, according to one embodiment, Load Balancing Module 216 comprises a plurality of components for performing the functions of Queue Manager 116, such as the re-ordering and monitoring of Processing Queue 214. In another embodiment, Load Balancing Module 216 may additionally comprise a plurality of components for communicating with, selecting, and balancing printing loads among any of Printing Devices 222 and 224. For instance, Printing Device 222 may be a color printer while Printing Device 224 may be a black and white printer. Further, Printing Device 226 may be a printing device designated for high resolution graphics. According to one embodiment, Load Balancing Module 216 is functional for balancing the load of print data that it receives among Printing Devices 222-226. Further, Load Balancing Module 216 may be functional for assigning particular print data to a particular printer based on the type of electronic document being printed. Thus, if Client Device 202 sends print data representing a high resolution graphic document, Load Balancing Module 216 ensures that the print data is sent to Printing Device 226. In this manner, the Print Server 210 has the ability to optimally allocate print data among a number of printing devices based upon the estimated processing time of each electronic document. Hence, unlike Queue Manager 116, Load Balancing Module 216 not only re-orders print data in Processing Queue 214 based upon an estimated time to process the electronic documents represented by the print data, but also allocates the print data according to the resource and compatibility of each Printing Device 222-226.

Although Rasterization Modules 112 and 212, Processing Queues 114 and 214, Timing Mechanisms 118 and 218, Estimation Logic 120 and 220 as well as Queue Manager 116 and Load Balancing Module 216 have been described in the context of a Printing Device 110 and a Print Server 210, respectively, these modules may be located in any other device that may perform the functions associated with the respective modules. Further, according to an alternative embodiment, the rasterization module, load balancing module and the processing queue may all be located on separate devices. Thus, for instance, Rasterization Module 212 may be accessed by a Printing Device 222 using a Web service such that the Web service provides any modules necessary for optimizing the printing of electronic documents. In this particular embodiment, when Printing Device 110 receives print data, the Printing Device may contact a Web service to optimize the printing of the print data. Also, each of Client Devices 202 and 204 may also host the described modules such that print optimization is performed before the print data is sent to Print Server 210 or Printing Device 110. Therefore, note that the process for optimizing the printing of electronic documents may be performed at any number of devices, including but not limited to Client Devices 202 and 204, a Print Server 210, Printing Devices 222-226 or any other device that has the ability to perform the described process. Further, although Printing Device 110 and Print Server 210 have been described with reference to particular components, the described process may be performed by any number of components capable of performing the invention.

III. Generating an Estimated Processing Time for an Electronic Document

When a user of a Client Device 101 wishes to print an electronic document, the user selects the electronic document and causes the Client Device 101 to send print data representing the electronic document to a Printing Device 110 or a Print Server 210. When either the Printing Device 110 or Print Server 210 receives print data representing an electronic document from the client device, according to one embodiment, the Printing Device 110 or Print Server 210 proceeds to determine an estimated processing time for the electronic document. In order to determine an estimated processing time for the electronic document, according to one embodiment, Printing Device 110 or Print Server 210 determines a time to process one or more portions of the print data representing the electronic document.

The actual processing time of an electronic document is usually defined as the time it takes the electronic document to print beginning from the time that the request to print the electronic document was received to the time that a printed version of the electronic document is completed and outputted at a physical tray of the printing device. Typically, the bulk of the processing time is spent in the rasterization of the print data. Rasterization is a process by which a two-dimensional image is converted from a vector based format into pixels or dots for output on a printing device, such as Printing Device 110. Thus, in order to generate an accurate estimated time to process an electronic document, the rasterization of print data representing the electronic document is taken into account.

According to one embodiment, both Printing Device 110 and Print Server 210 comprise a Rasterization Module 112 and 212, respectively, for processing print data in preparation for printing. The Rasterization Modules 112 and 212 of Printing Device 10 and Print Server 210 are configured to process one or more portions of print data in order to generate an estimated time to process the electronic document as a whole. Thus, instead of consuming time by processing the entire print data, the Rasterization Modules 112 and 212 of Printing Device 110 and Print Server 210 may be configured to perform lightweight processing for the purposes of providing Estimation Logic 120 or 220 with enough information to generate an estimated time to process an electronic document. Thus, according to one embodiment, when the Rasterization Module 112 or 212 receives print data from Client Device 101, Rasterization Module 112 or 212 begins to process at least a portion of the print data by rasterizing the portion of the print data. It should be noted, that in other embodiments, other methods for processing portions of print data may be applied for estimating the processing time to process the entire print data.

Figure 3:
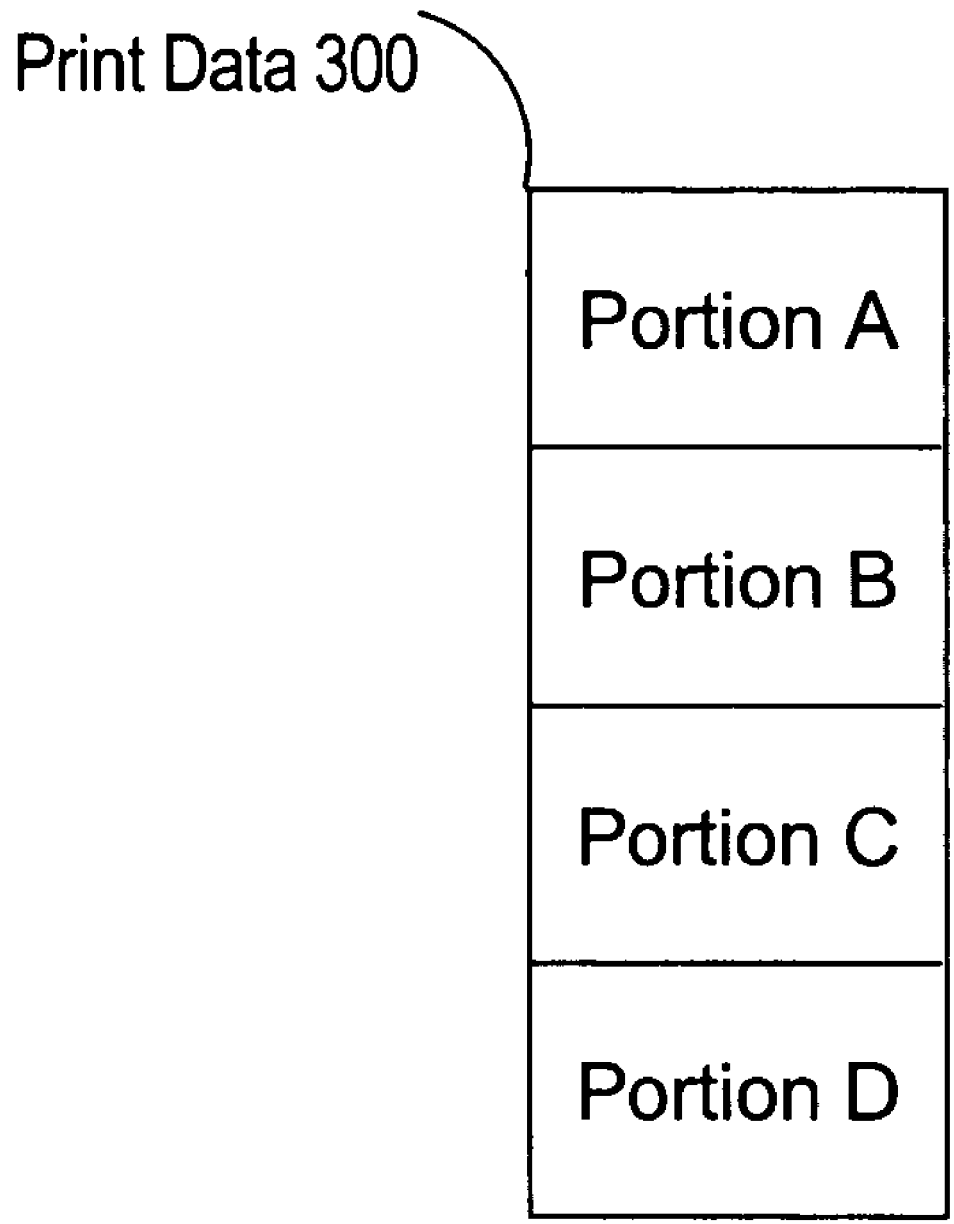
FIG. 3 is a block diagram of an example implementation of a rasterization module according to one embodiment of the invention.

Referring to FIG. 3 and according to one embodiment, Print Data 300 is represented by portions A, B, C and D. When Rasterization Module 112 or 212 begins to process one or more portions A-D of Print Data 300, Timing Mechanism 118 or 218 keeps track of how long it takes to process the one or more portions of the print data. Once a portion of the print data is processed, Estimation Logic 120 or 220 may use information from Timing Mechanism 118 or 218 and the Rasterization Module 112 or 212 to estimate the amount of time it will take to process all of the print data representing an electronic document. For instance, according to one embodiment, when Rasterization Module receives Print Data 300 from Client Device 101, Rasterization Module 112 or 212 may only process portion A. Alternatively, Rasterization Module 112 or 212 may process portions B and D. Further, Rasterization Module 112 or 212 may be configured to process any combination of portions.

In one embodiment, Rasterization Module 112 or 212 is configured to process any combination of portions of Print Data 300 by receiving information about Print Data 300 from Client Device 101. For instance, Client Device 101 may provide information that portion A is text intensive and portion D includes high resolution graphics. Further, in another embodiment, the decision regarding which portion of Print Data 300 to process can be made by the Estimation Logic 120 or 220, which can in turn request that the Rasterization Module process particular portions of the Print Data 300. Additionally, Rasterization Module 112 or 212 may process portions of Print Data 300 in a random manner. Rasterization Module 112 or 212 may be configured to process any combination of portions of Print Data 300 using any acceptable method and through any component.

When Rasterization Module 112 or 212 is processing any portion A-D, for instance, Timing Mechanism 118 or 218 keeps track of how long it is taking the Rasterization Module to process the particular portion. In one embodiment, Rasterization Module 112 or 212 notifies Timing Mechanism 118 or 218 when it has started and finished processing portion A. Using a counter mechanism, according to one embodiment, Timing Mechanism 118 or 218 is thus able to keep track of how long it has taken Rasterization Module 112 or 212 to complete processing portion A. After Timing Mechanism 118 or 218 has tracked the time to process one or more portions, Estimation Logic 120 or 220 can begin to generate an estimated time to process all portions of Print Data 300.

For example, suppose that Timing Mechanism 118 or 218 determines that it takes 3 seconds to process portion A. Estimation Logic 120 or 220 can generate an estimated time to process all portions A-D by simply multiplying the time to process portion A, 3 seconds, by the total number of portions of Print Data 300. In this particular embodiment, the estimated time to process Print Data 300 would be twelve seconds. This assumes that an approximately equal amount of time is required to process each portion of Print Data 300. In some situations, this may not be true. For example, the portions in Print Data 300 may contain different amounts or types of data and there may require different amounts of time to rasterize. Therefore, according to one embodiment of the invention, various heuristics may be employed to estimate an amount of time to process entire Print Data 300, based upon the amount of time required to process one or more portions of Print Data 300 and the size and composition of those portions of Print Data 300 relative to other portions of Print Data 300.

In some situations, Rasterization Module 112 or 212 might need to process more than one portion to accurately estimate the amount of time it will take to process all of Print Data 300. In this manner, Rasterization Module 112 or 212 may be configured to process any number of portions of print data. Generally, the more portions that are processed by the Rasterization Module 112 or 212, the more accurate the estimation will be and vice versa. For instance, assume portion A of Print Data 300 contains text while portions B-D contains high quality images which will take longer to rasterize. If Rasterization Module 112 or 212 only processes portion A to estimate the time to process A-D, the estimated time to process the entire print data might not be accurate considering it takes longer to process high quality images. However, if Rasterization Module 112 or 212 processes portions A and D, for instance, the estimated time to process would be more accurate. Alternatively, generating an estimated time to process the print data may involve multiple factors, including but not limited to the overhead time for processing or rasterizing a portion of the print data, any delay or error at the printing device, mechanical speed of the printing device, as well as any other factor that may effect the processing time of an electronic document.

By providing this granularity, Rasterization Module 112 or 212 may be configured such that Estimation Logic 120 or 220 will provide a more accurate estimation of the time to process all of Print Data 300. Further, as indicated above, the determination of which portions of Print Data 300 to process may be made by any component capable of configuring the Rasterization Module 112 or 212 to process one or more portions of Print Data 300. Alternatively, in another embodiment, the Rasterization Module itself may be capable of determining which portions of Print Data 300 to process.

In another embodiment, once an estimated time to process the print data representing the entire electronic document has been generated, the estimated time is reported back to a client device that requested that the electronic document be processed. Thus, if Client Device 101 sent the print data to Printing Device 110, once Printing Device 110 has determined the estimated time to process the electronic document, Printing Device 110 communicates the estimated time to process to Client Device 101. In one embodiment, the information representing the estimated time to process the electronic document is presented on a user interface of the client device for a user.

Additionally, throughout the optimization process, Printing Device 110 can continue to report the estimated processing time of a particular electronic document to Client Device 101. This may be useful, for instance, if the original estimated time to process is no longer accurate due to a malfunction at the printing device or the introduction of additional print data with higher priority. Note that although the above functions have been described in relation to Printing Device 110, the same also applies to Print Server 210, as well as any other device or mechanism capable of performing the described functions.

IV. Re-Ordering Print Data in the Processing Queue

Figure 4A:
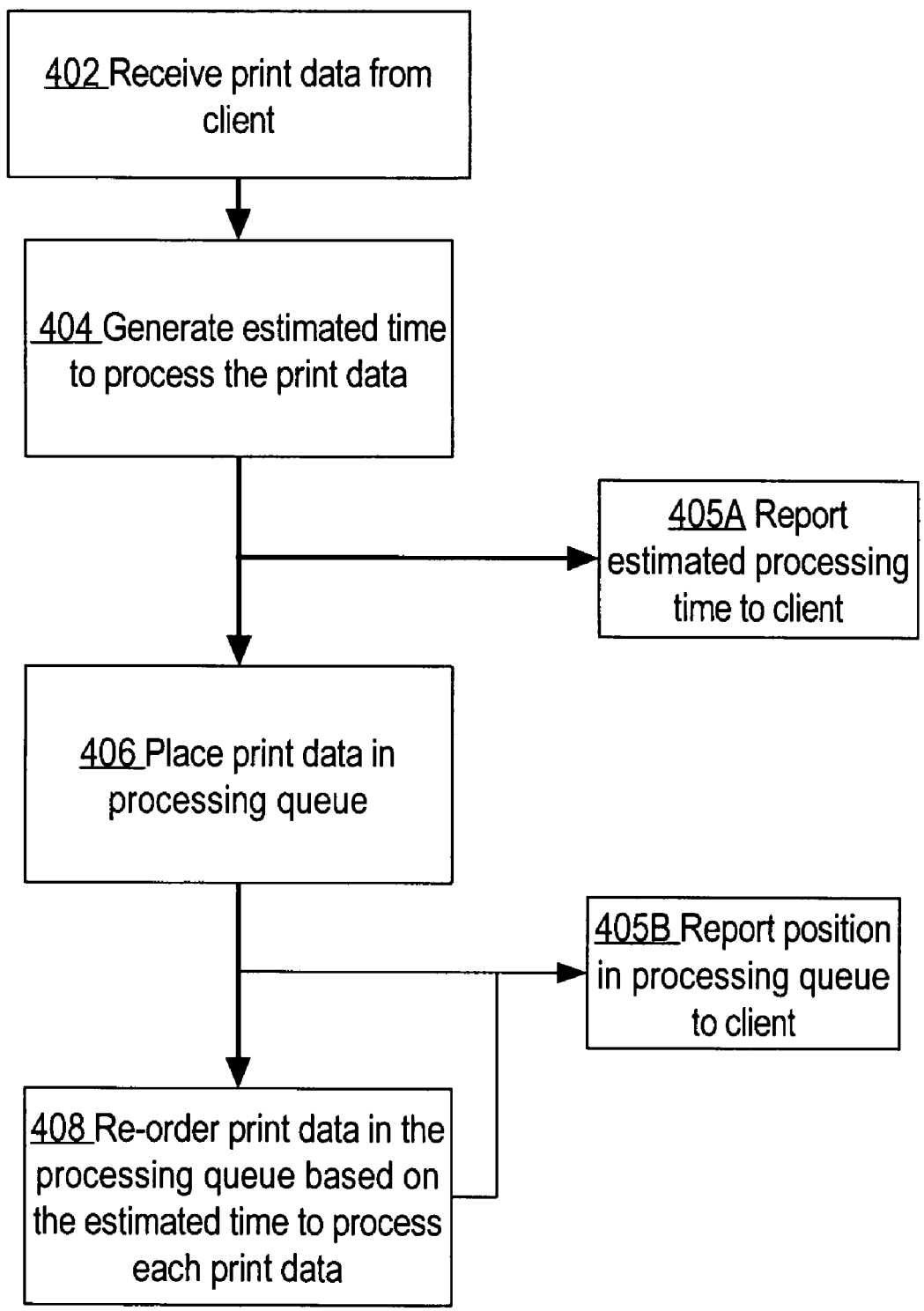
FIG. 4A is a flow diagram that depicts an approach for re-ordering print data in a processing queue according to one embodiment of the invention.

Referring to FIG. 4A, according to one embodiment, when print data representing an electronic document is received from a client device such as Client Device 101, 202 or 204, the print data are processed by a Rasterization Module 112 or 212. The Printing Device 110 or Print Server 210 that received the print data generates an estimated time to process the electronic document according to the process described above. Once the estimated time to process the electronic document has been generated, the optimized printing of electronic documents is possible. According to one embodiment, both Printing Device 110 and Print Server 210 each contain a Processing Queue 114 and 214, respectively. Once print data has been received, the print data is placed at the "tail" of the processing queue, and the "head" of the processing queue represents the first print data to enter the processing queue. In this first-in first-out manner, any print data at the head of the processing queue will be the next to be printed by the Printing Device 110 or sent to another printing device by Print Server 210, while any print data at the tail of the processing queue will be last.

A. Re-Ordering Based on Estimated Processing Time

According to one embodiment estimated times to process electronic documents are used to re-order print data in the processing queue. Referring to FIG. 4A, according to one embodiment, a flowchart representing the re-ordering of a processing queue based on the estimated processing time is shown. At step 402, the Printing Device 110 or Print Server 210 receives print data from the client device. When the print data representing an electronic document is received, at step 404, an estimated time to process the electronic document is generated using a Rasterization Module as described in FIG. 3. At this point, according to step 405A, the estimated processing time may be optionally reported back to the client device. Once the estimated time to process the electronic document has been generated, at step 406, the print data is placed in the Processing Queue 114 or 214. The Processing Queue 114 or 214 may hold print data that was previously submitted. Thus, without performing optimization, any print data subsequently received from a client device will be placed at the "tail" of the queue.

Further, according to another embodiment, the relative position of the print data in Processing Queue 114 or 214 may also be optionally reported back to the client device. Thus, after placing the print data in the Processing Queue 114 or 214 in step 406, the position of the print data in the Processing Queue 114 or 214 is reported back to the client at step 405B. Further, in other embodiments, the position of the print data in the Processing Queue 114 or 214 may be reported at any time throughout the optimization process. Hence, according to another embodiment, the relative position of print data in the Processing Queue 114 or 214 may also be reported to the client after step 408 as described below. In this manner, Queue Manager 116 or Load Balancing Module 216 can be configured to initially estimate the order of print data in Processing Queue 114 or 214 according to the re-ordering process set forth herein and report such back to the client device at step 405B.

FIG. 5 is a block diagram depicting tables which represent a processing queue during different times of the optimization process. For instance, according to one embodiment, Tables 502, 504, 506 and 508 represent a processing queue at different points in time. Further the row labeled "HEAD" in each table represents the head of the queue, or in other words, the row representing the print data that is scheduled next for printing. The additional rows above the "HEAD" row are all printed in order beginning from the head of the queue and continuing upwards through each row depending on the number of print data is in the processing queue. Note, for purposes of example, that each Print Data #'s 1-6 in Tables 502, 504, 506 and 508 represent an entire electronic document for processing.

Without any optimization of the processing queue, each print data (or electronic document) will print in a first-in first-out manner. However, at step 408, the print data in the processing queue is re-ordered based on the estimated time to process each electronic document represented by the print data. In one embodiment, when the print data is placed in the processing queue, Queue Manager 116 or Load Balancing Module 216 receives information representing the estimated time to process the print data as previously calculated by the Rasterization Module 112 or 212. The Queue Manager then compares the estimated processing time of each print data in the processing queue and re-orders the processing queue such that the print data with the shortest estimated processing time is at the head of the processing queue.

Thus, referring to FIG. 5, at Table 502, assume print data #1 was the first print data to be received by Printing Device 110 or Print Server 210, followed by print data #2, 3, 4 and 5. According to Table 502, print data #5 has an estimated processing time of 1 second, while print data #1 has an estimated processing time of 5 seconds. Thus, Queue Manager 116 or Load Balancing Module 216 places print data #5 at the head of the processing. Next, print data #4 is placed directly above print data #5 because it has the second shortest estimated processing time. In this manner, the print data in the processing queue is re-ordered. Further, in another embodiment, every time a new job arrives, Queue Manager 116 or Load Balancing Module 216 compares the estimated processing time for every print data in the processing queue and recalculates the order of the print data. Although embodiments of the invention have been described in the context of estimate processing time in seconds, the approach is not limited to this context and any unit of time may be used, depending upon the implementation.

B. Re-Ordering Based on In-Queue Time & Estimated Processing Time

Figure 4B:
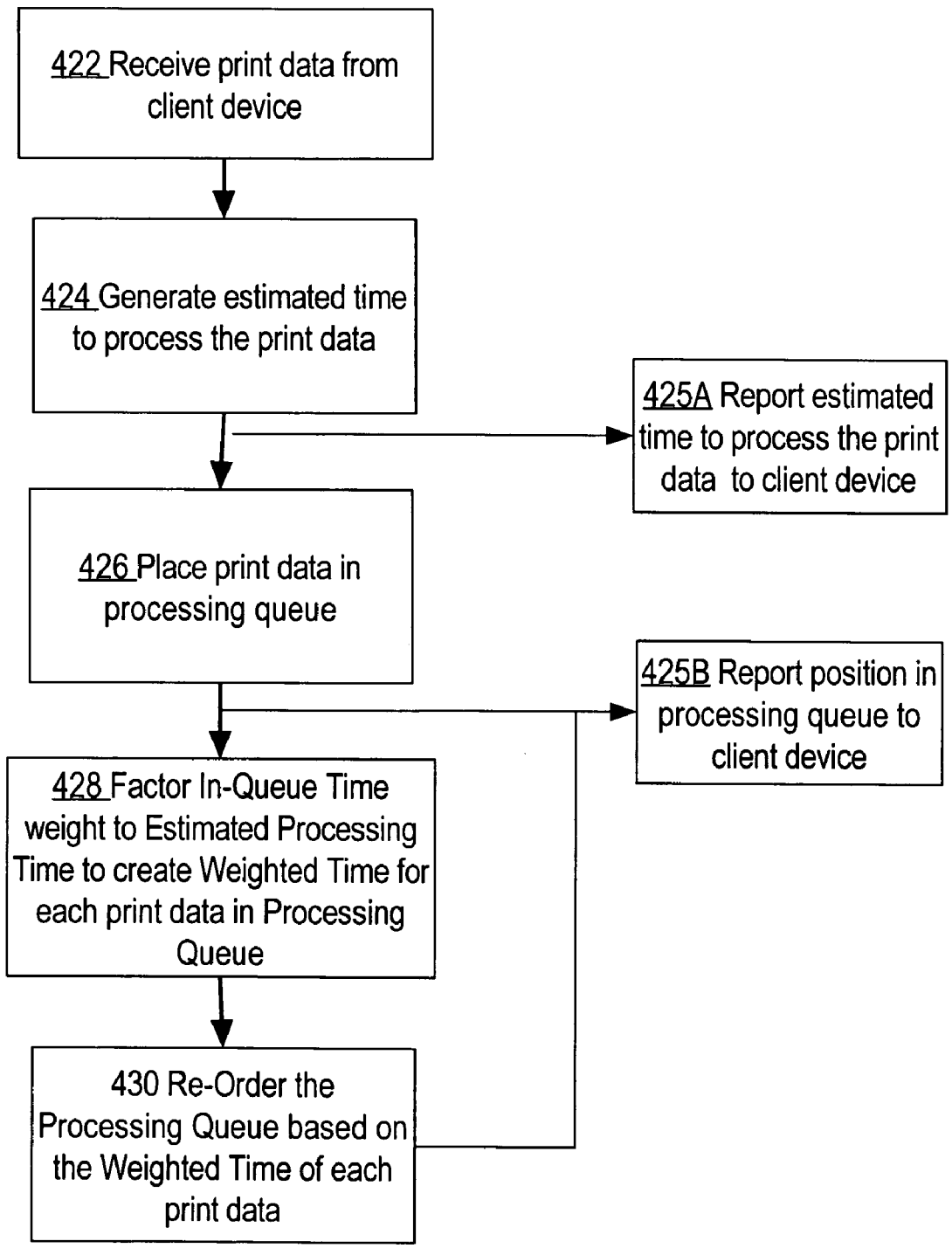
FIG. 4B is a flow diagram that depicts a second approach for re-ordering print data in a processing queue according to one embodiment of the invention.

In another embodiment, the optimized printing of electronic documents may also be accomplished by re-ordering the print data in the processing queue based on both the estimated processing time of all the print data and the amount of time each print data has been waiting in the processing queue. In such an embodiment, referring to FIG. 4B, in steps 422-426, the print data is received, an estimated time to process is generated for the electronic document represented by the print data and the print data is placed in a Processing Queue 114 or 214. Additionally, at step 425A, Printing Device 110 or Print Server 210 may report the estimated processing time of the electronic document back to the client device. Further, in another embodiment, Printing Device 110 or Print Server 210 may report the position of the print data in the Processing Queue 114 or 214 back to the client device at step 425B.

After the print data is placed in the processing queue, at step 428, the In-Queue Time of each print data is used to create a Weighted Time for each print data in the processing queue. The In-Queue Time of each print data represents the actual amount of time each print data has been in the processing queue since entering the queue. In one embodiment, the Queue Manager 116 or Load Balancing Module 216 comprises one or more components for tracking the amount of time each print data has been in the processing queue. Each time print data is printed or introduced into the processing queue, Queue Manager 116 or Load Balancing Module 216 updates the In-Queue Time for each print data in the processing queue.

Referring back to FIG. 5, in Table 504, note that the In-Queue Time Qn for print data #1-4 is 1 because each of print data 1-4 was also in the processing queue in Table 502. However, after print data #5 has been printed, print data #1-4 have waited in the processing queue for a designated In-Queue Time Qn. In one embodiment, the In-Queue Time Qn is an amount of time relative to the estimated processing time of the print data n that was last printed. Hence, according to Table 504, the In-Queue Time Qn of print data #1-4 represents the estimated processing time of print data #5. Next, note that after print data #4 has been printed, in Table 506 print data #1-3 each have an In-Queue time Qn of 3, which represents the estimated processing time of print data #5 as well as the estimated processing time of print data 4, both of which have been printed before print data #1-3.

Although the In-Queue Time Qn for print data in the processing queue has been described in relation to the estimated processing time Pn of a print data n that was last printed, the In-Queue Time Qn may represent any other value that signifies the amount of time any print data has waited in the processing queue. For instance, in one embodiment, the In-Queue Time Qn may represent the number of print data that have been printed since any print data n has entered the processing queue.

Using the In-Queue Time of a particular print data, according to one embodiment, the Queue Manager 116 or Load Balancing Module 216 creates a Weight Wn for each print data. The Queue Manager 116 or Load Balancing Module 216 combines the Weight Wn of any print job n, with the Estimated Processing Time Pn of the print job to create a Weighted Time, Tn. Hence, according to one embodiment, this process is summarized as Tn=Wn×Pn.

In one embodiment, Wn for any print data n is inversely proportional to the In-Queue Time Qn of the print data. Thus, according to Table 506, In-Queue Time, Qn for print data #1 is 3. Therefore, the Weight Wn of print data #1 is 0.7, or 1-Qn/10. However, in other embodiments, the Weight Wn of each print data n may be calculated using any appropriate method that considers the In-Queue Time Qn of the print data.

After the weighted time Tn is calculated, Queue Manager 116 or Load Balancing Module 216 uses the weighted time Tn to determine which print data to send to the head of the processing queue. Thus, at step 430, the processing queue is re-ordered based on the weighted time Tn of each print data in the processing queue. Further, once the processing queue has been re-ordered, the relative position of the print data in the processing queue may be optionally reported back to the client device at step 425B. Hence, a user at a client device may be continuously updated as to the relative position of a print job in the processing queue during the optimization process.

Referring back to FIG. 5, note that at Table 504 a new print data 6 is introduced into the processing queue. After initially placing print data #6 in the processing queue, the Queue Manager 116 or Load Balancing Module 216 also factors in print data 6 in re-ordering all the print data in the processing queue. Thus, according to Table 504, print data #6 is reported to have an estimated processing time Pn of 2. However, because print data #6 has just been placed in the processing queue, the In-Queue Time Qn of print data #6 is 0. Hence, the Weight for print data #6 is initially calculated as 1. By combining the Weight Wn with the estimated processing time Pn of print data #6, the Queue Manager 116 or Load Balancing Module 216 determines that the Weighted Time Tn of print data #6 is 2. Thus, even though print data #1-3 have been in the queue longer than print data #6, print data 6 is placed closer to the head of the processing queue because it is associated with a shorter Weighted Time Wn. Hence, at Table 506, print data #6 is at the head of the processing queue.

In this manner, the optimization of the processing queue is performed by using both the estimated processing time Pn reported by the Rasterization Module 112 or 212 and the In-Queue Time Qn for each print data.

C. Re-Ordering Based on the on In-Queue Time, Estimated Processing Time and Designated Priority of Print Data In another embodiment, additional factors may be used to re-order print data contained in a processing queue. For instance, a client device may send print data that is designated as high priority. In this scenario, the priority of the print data may be handled using two different approaches. In one approach, the priority of the print data may override the processing queue such that any print data with priority is automatically processed when it is received.

In another approach, any designated priority for any print data may be factored in to the re-ordering of the processing queue. In one embodiment, the designated priority is factored into the weight Wn of any print data n. For example, in Table 506, print data 2 has an estimated processing time of 4 with a weight of 0.7, giving print data 2 a weighted time of 2.8. However, if job 2 was given a designated priority, the Weight Wn of print data 2 can be changed to 0.5, for instance, thus giving it a Weighted Time Tn of 2. Therefore, with the designated priority factored into the re-ordering process, print data 2 has now jumped ahead of print data 3 in the processing queue.

Figure 4C:
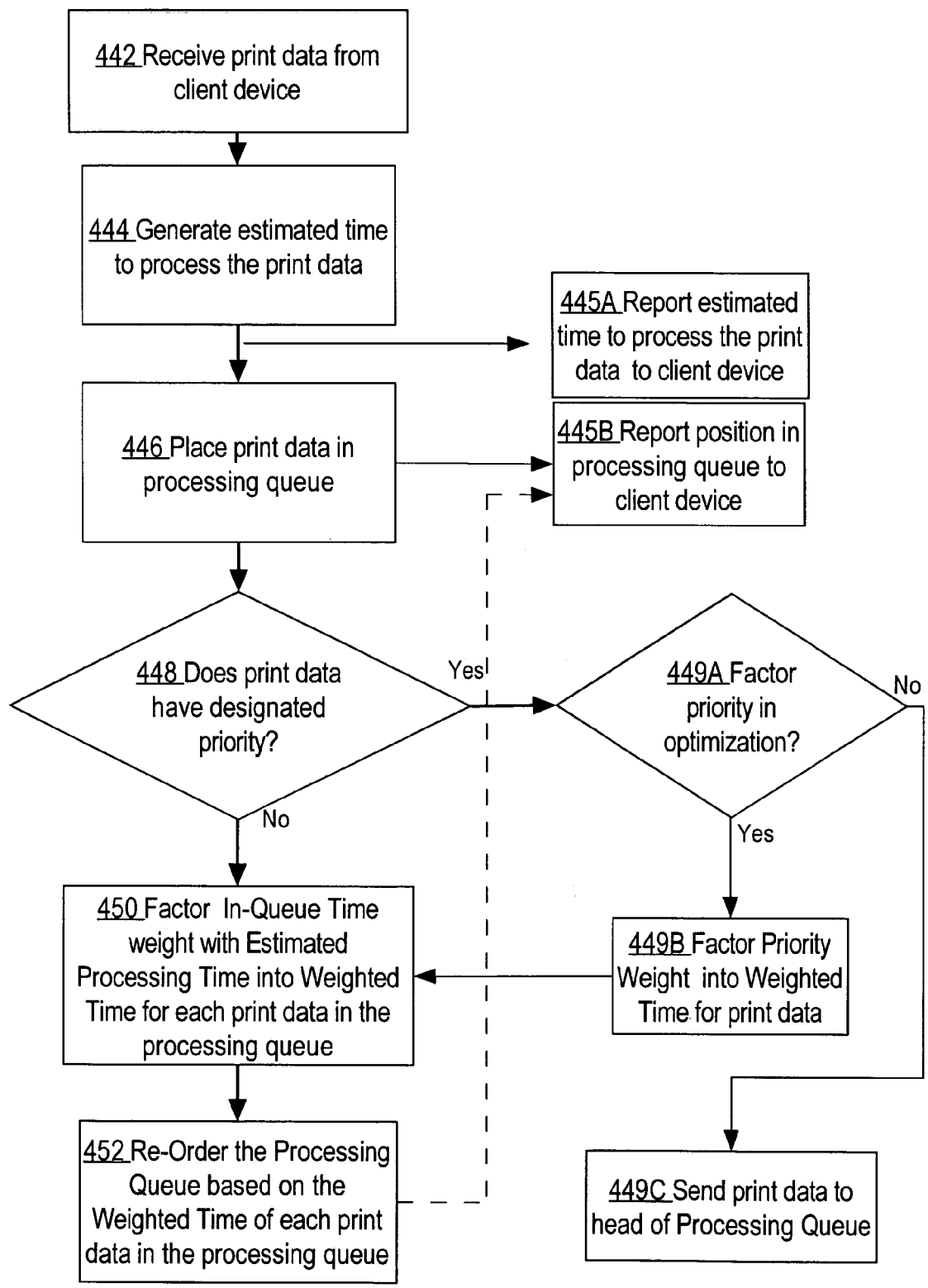
FIG. 4C is a flow diagram that depicts a third approach for re-ordering print data in a processing queue according to one embodiment of the invention.

Referring to FIG. 4C, a flow diagram depicting the process of re-ordering print data based on In-Queue Time, estimated processing time and designated priority of print data is shown. In steps 442-446, Printing Device 110 or Print Server 210 receives print data from a client device, generates an estimated time to process the electronic document represented by the print data and places the print data in a processing queue. Additionally, Printing Device 110 or Print Server 210 may report the estimated processing time of the electronic document back to the client device. Further, in another embodiment, Printing Device 110 or Print Server 210 may report the position of the print data in the processing queue back to the client device at step 445B.

Next, at step 448, the Printing Device 110 or Print Server 210 determines if the received print data has any designated priority. According to one embodiment, when a client device sends print data to either Printing Device 110 or Print Server 210, the client device also sends information representing any designated priority for the print data. If the Printing Device 110 or Print Server 210 detects that the print data has a designated priority, at step 449A, the Printing Device 110 or Print Server 210 determines whether to factor the designated priority of the print data into the optimization process. For instance, in one embodiment, the information representing the designated priority for the print data may indicate that the print data is high priority and to bypass any optimization process. If so, at step 449C, the print data is immediately sent to the head of the processing queue. Alternatively, the print data may be sent directly to printing module of a print device for immediate printing. At this point, the position of the print data in the processing queue may be optionally reported back to the client device at step 445B.

Otherwise, if the designated priority for the print data does not request that the optimization process be bypassed, the process proceeds to step 449B, where the Printing Device 110 or Print Server 210 factors in the designated priority into the Weight Wn of the received print data n.

At step 450, the In-Queue Time Qn is added to the Weight Wn of print data n such that the Weight Wn represents both the In-Queue Time and the designated priority of the print data. Thus, in one embodiment, a Weight Wn factored with both the In-Queue Time Qn and a designated priority will be lower than a Weight Wn only factored with the In-Queue Time Qn. A lower Weight Wn, when combined with the estimated processing time Pn of any print data n, will always result in a lower weighted time Tn. Thus, at step 452, the Queue Manager 116 or Load Balancing Module 216 re-orders the print data in the processing queue according to the Weighted Time Tn of each print data. Further, once the processing queue has been re-ordered, the relative position of the print data in the processing queue may be optionally reported back to the client device at step 445B. Hence, a user at a client device may be continuously updated as to the relative position of a print job in the processing queue during the optimization process. In this manner, the designated priority of any print data n may be factored into the optimization process.

V. Implementation Mechanisms

Figure 6:
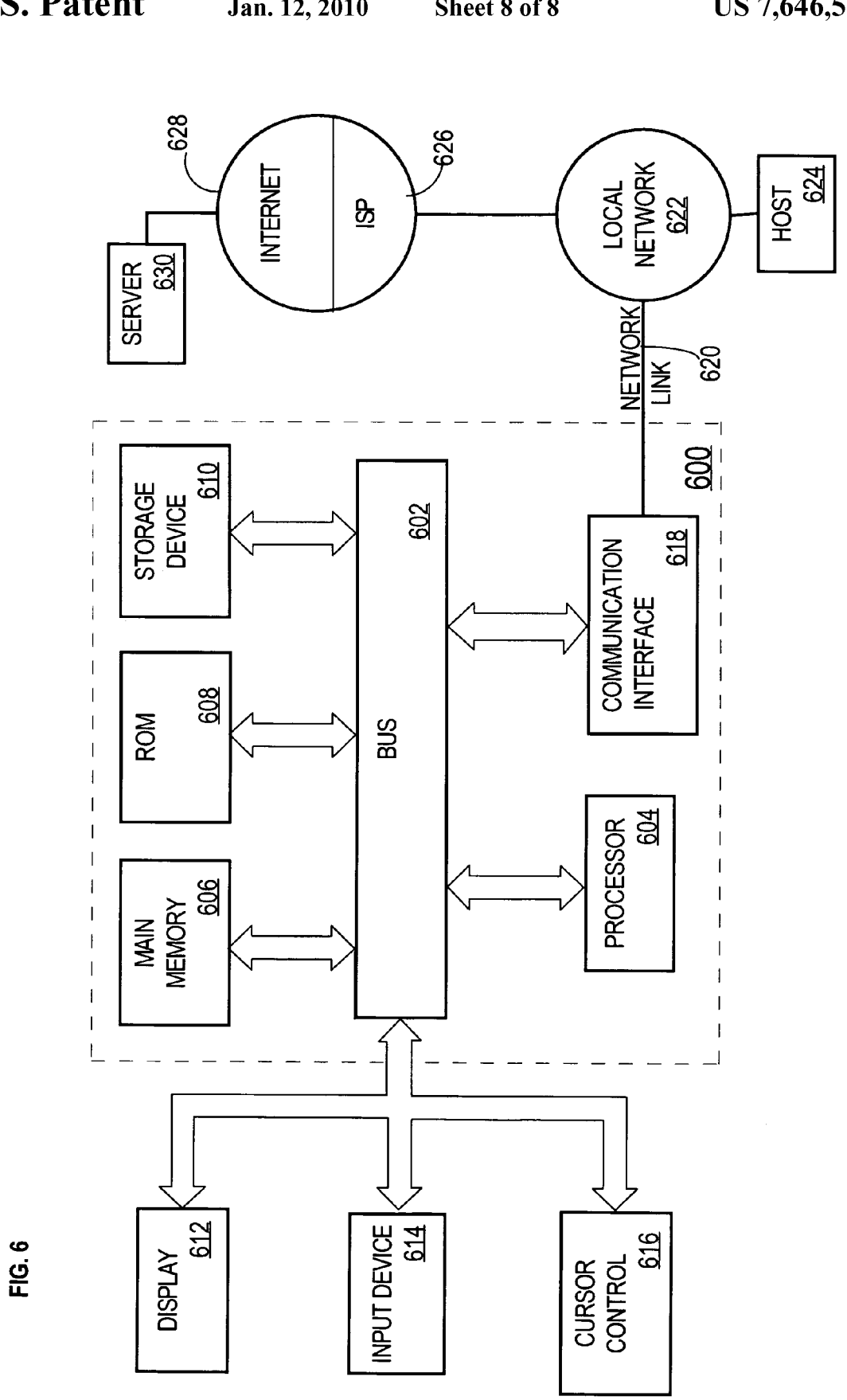
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for optimizing the printing of electronic documents, comprising:
   receiving over a communications network first print data representing at least a portion of a first electronic document for processing;
   generating an estimated time to process the first electronic document;
   placing the first print data in a processing queue comprising one or more additional print data representing one or more additional electronic documents for processing; and
   re-ordering the first print data and the one or more additional print data in the processing queue based on the estimated time to process the first electronic document and one or more estimated times to process the one or more additional electronic documents.

2. The method of claim 1, wherein re-ordering the first print data and the one or more additional print data in the processing queue further comprises re-ordering the first print data and the one or more additional print data in the processing queue based on an amount of time the first print data has been in the processing queue and one or more amounts of time the one or more additional print data has been in the processing queue.

3. The method of claim 1, wherein re-ordering the first print data and the one or more additional print data in the processing queue further comprises re-ordering the first print data and the one or more additional print data in the processing queue based on a designated priority for at least a particular print data from the first print data and the one or more print data in the processing queue.

4. The method of claim 3, further comprising receiving over the communications network from a client device from which the first print data was received data that indicates the designated priority.

5. The method of claim 4, wherein the data that indicates the designated priority is sent over the communications network from the client device in response to a user requesting priority for at least the particular print data at the client device.

6. The method of claim 1, further comprising providing data to a client device indicating the estimated time to process the first electronic document.

7. The method of claim 1, further comprising providing data to a client device indicating the position of the first print data in the processing queue and the estimated time to process the first electronic document 8. The method of claim 1, wherein generating the estimated time to process the first electronic document further comprises:
   determining a time to process one or more portions of the first print data; and
   based on the time to process the one or more portions of the first print data, calculating an estimated time to process all portions of the first print data representing the first electronic document.

9. The method of claim 1, further comprising selecting print data from the processing queue and causing the selected print data to be processed by the print process.

10. The method of claim 9, wherein selecting print data from the processing queue includes selecting print data from the processing queue based on the order of the print data in the processing queue.

11. A printing device comprising:
    a print process configured to process print data and cause a printed version of an electronic document to be generated; and
    wherein the printing device is configured to:
      receive over a communications network first print data representing at least a portion of a first electronic document for processing;
      generate an estimated time to process the first electronic document;
      place the first print data in a processing queue comprising one or more additional print data representing one or more additional electronic documents for processing; and
      re-order the first print data and the one or more additional print data in the processing queue based on the estimated time to process the first electronic document and one or more estimated times to process the one or more additional electronic documents.

12. The printing device of claim 11 wherein the printing device is further configured to re-order the first print data and the one or more additional print data in the processing queue based on an amount of time the first print data has been in the processing queue and one or more amounts of time the one or more additional print data has been in the processing queue.

13. The printing device of claim 11, wherein the printing device is further configured to re-order the first print data and the one or more additional print data in the processing queue based on a designated priority for at least a particular print data from the first print data and the one or more print data in the processing queue.

14. The printing device of claim 13, wherein the printing device is further configured to receive over the communications network from a client device from which the first print data was received data that indicates the designated priority.

15. The printing device of claim 14, wherein the data that indicates the designated priority is sent over the communications network from the client device in response to a user requesting priority for at least the particular print data at the client device.

16. The printing device of claim 11, wherein the printing device is further configured to provide data to a client device indicating the estimated time to process the first electronic document.

17. The printing device of claim 11, wherein the printing device is further configured to further to provide data to a client device indicating the position of the first print data in the processing queue and the estimated time to process the first electronic document.

18. The printing device of claim 11, wherein the printing device is further configured to determine the estimated time to process the first print data by:
- determining a time to process one or more portions of the first print data; and
- based on the time to process the one or more portions of the first print data, calculating an estimated time to process all portions of the first print data representing the first electronic document.

19. The printing device of claim 11, wherein the printing device is further configured to select print data from the processing queue and cause the selected print data to be processed by the print process.

20. The printing device of claim 19, wherein the printing device selects print data from the processing queue based on the order of the print data in the processing queue.

21. A computer-readable medium for optimizing the printing of electronic documents, the computer-readable medium carrying instructions which, when processed by one or more processors cause:
- receiving over a communications network first print data representing at least a portion of a first electronic document for processing;
- generating an estimated time to process the first electronic document;
- placing the first print data in a processing queue comprising one or more additional print data representing one or more additional electronic documents for processing; and
- re-ordering the first print data and the one or more additional print data in the processing queue based on the estimated time to process the first electronic document and one or more estimated times to process the one or more additional electronic documents.

22. The computer-readable medium of claim 21, further comprising additional instructions, which, when processed by the one or more processors, cause:
- re-ordering the first print data and the one or more additional print data in the processing queue based on an amount of time the first print data has been in the processing queue and one or more amounts of time the one or more additional print data has been in the processing queue.

23. The computer-readable medium of claim 21, further comprising additional instructions, which, when processed by the one or more processors, cause:
- re-ordering the first print data and the one or more additional print data in the processing queue based on a designated priority for at least a particular print data from the first print data and the one or more print data in the processing queue.

24. The computer-readable medium of claim 23, further comprising additional instructions, which, when processed by the one or more processors, cause:
- receiving over the communications network from a client device from which the first print data was received data that indicates the designated priority.

25. The computer-readable medium of claim 24, wherein the data that indicates the designated priority is sent over the communications network from the client device in response to a user requesting priority for at least the particular print data at the client device.

26. The computer-readable medium of claim 21, further comprising additional instructions, which, when processed by the one or more processors, cause:
- providing data to a client device indicating the estimated time to process the first electronic document.

27. The computer-readable medium of claim 21, further comprising additional instructions, which, when processed by the one or more processors, cause:
- providing data to a client device indicating the position of the first print data in the processing queue and the estimated time to process the first electronic document.

28. The computer-readable medium of claim 21, wherein generating the estimated time to process the first print data includes:
- determining a time to process one or more portions of the first print data; and
- based on the time to process the one or more portions of the first print data, calculating an estimated time to process all portions of the first print data representing the first electronic document.

29. The computer-readable medium of claim 21, further comprising additional instructions, which, when processed by the one or more processors, cause:
- selecting a particular print data from the processing queue and cause the selected print data to be processed by the print process.

30. The computer-readable medium of claim 29, further comprising additional instructions, which, when processed by the one or more processors, cause:
- selecting a particular print data from the processing queue based on the order of the print data in the processing queue.

* * * * *